United States Patent [19]
Ayers

[11] 3,834,004
[45] Sept. 10, 1974

[54] METHOD OF PRODUCING TOOL STEEL BILLETS FROM WATER ATOMIZED METAL POWDER

[75] Inventor: Maurice Donald Ayers, Greenwich, Conn.

[73] Assignee: Metal Innovations, Inc., Stamford, Conn.

[22] Filed: Mar. 1, 1973

[21] Appl. No.: 337,139

[52] U.S. Cl.............. 29/420.5, 29/DIG. 31, 30/350, 75/208 R, 75/214, 75/226, 76/101 R
[51] Int. Cl................................................ B22f 3/24
[58] Field of Search................... 29/420.5, DIG. 31; 75/208 R, 214, 226; 76/101 R, DIG. 3; 30/346.54, 350

[56] References Cited
UNITED STATES PATENTS

| | | | |
|---|---|---|---|
| 3,150,444 | 9/1964 | Reen | 29/420.5 |
| 3,158,474 | 11/1964 | Andersen et al. | 75/214 |
| 3,168,399 | 2/1965 | Takahashi et al. | 75/208 R |
| 3,244,506 | 4/1966 | Reen | 29/420.5 X |
| 3,646,176 | 2/1972 | Ayers | 264/11 |
| 3,655,365 | 4/1972 | Holtz | 75/226 X |
| 3,671,230 | 6/1972 | Smythe et al. | 29/420.5 X |
| 3,708,284 | 1/1973 | Chao | 75/214 X |
| 3,744,993 | 7/1973 | Matt et al. | 75/214 X |
| 3,746,518 | 7/1973 | Holtz | 29/420.5 X |

*Primary Examiner*—Charles W. Lanham
*Assistant Examiner*—D. C. Reiley, III
*Attorney, Agent, or Firm*—Mandeville and Schweitzer

[57] ABSTRACT

A method of producing tool steels in billet form, based upon the initial production of atomized tool steel powder which is consolidated to billet form and then hot worked and subsequently processed in a more or less conventional manner to achieve cutting tool material.

The process of the invention involves first preparing a body of molten steel, refined to appropriate tool steel analysis, and then subjecting the molten tool steel to liquid atomization substantially in accordance with the teachings of my prior U.S. Pat. No. 3,646,176. From this liquid atomization there is achieved small, highly irregular steel particles of adequately low oxide content, which have exceptional properties for the purpose of the process of the invention. The atomized metal particles are then encased in an elongated tubular sheath formed of a mild steel tubing, and the ends of the tubing are closed off as by welding caps in place. The encased metal particles at this stage have an apparent density of around 45 percent.

After encasement, the metal particles are consolidated in two or more stages, involving heating of the metal particles and subsequent radial compaction. In the first stage, the metal is heated to a temperature in the range of 1,700° to 2,250° and then compacted, preferably by rotary swaging. In the second stage, the metal particles are heated to a somewhat higher temperature, 1,800° to 2,300°, and the heated particles are again subjected to radial compaction, ideally in a rotary swaging machine. After compacting in a second stage, the confined metal powder has been consolidated to an apparent density of at least 80 percent, and ideally to a density of 85 percent or higher. At this stage, the billets are in suitable form for hot working to size. In the course of this process, the metal is consolidated further substantially to 100 percent density.

After a billet has been hot worked to final size, the original encasing sheath is removed, typically by grinding, to expose the core of extremely high quality tool steel. This exposed core may be handled in a conventional manner to derive the ultimate cutting tools therefrom.

13 Claims, 4 Drawing Figures

PATENTED SEP 10 1974                    3,834,004

METHOD OF PRODUCING TOOL STEEL BILLETS FROM WATER ATOMIZED METAL POWDER

BACKGROUND AND SUMMARY OF THE INVENTION

It has for some time been recognized that significant advantages are to be derived from the formation of tool steels by the consolidation of atomized particles of tool steel composition. The resulting material has significant metallurgical advantages over tool steel formed by, for example, the more conventional procedures of casting ingots or billets from molten tool steel. The Reen U.S. Pat. No. 3,150,444 describes some of these advantages. The advantages to be derived from the use of atomized particles stem from the fact that, in the relatively slow process of cooling molten tool steel in an ingot mold, there is a tendency toward undesirable segregation and consolidation of certain of the alloying constituents and impurities. Moreover, the fact that cooling progresses in a non-uniform manner throughout the cross section of the ingot results in differing metallurgical composition and structure throughout the cross section.

It has been recognized heretofore that, if molten tool steel were to be atomized directly from the molten state into fine metal particles, the metallurgical composition and structure could be better and more uniformly retained throughout the material. Upon subsequent consolidation of the metal particles, the advantageous metallurgical characteristics could be retained.

While the underlying principles of deriving tool steel materials from an atomizing process have been long and well recognized, the actual practice of the technique has been extremely difficult and very expensive, such that the technique has seen only limited commercial use to date notwithstanding its known technical advantages.

In accordance with heretofore known commercial procedures, batches of atomized tool steel powder have been "canned" and then initially consolidated by cold isostatic pressing, usually to final configuration, followed by other procedures such as hot isostatic pressing, sintering, etc., to achieve the finished product. While the finished product has remarkable and desired properties, the capital investment required and the operating costs of achieving the product have been excessively high.

In accordance with the present invention, a procedure is made available for enabling atomized metal of tool steel analysis to be economically consolidated to a commercially workable condition in billet form. Thus, the significant end product of the present invention is a billet of tool steel analysis, which may be hot rolled, hot worked or otherwise handled and processed in a relatively conventional manner using available, conventional equipment. The new process achieves remarkable efficiencies, due in great measure to the fact that it is possible initially to prepare and utilize the material in billet form, omitting any steps of cold or hot isostatic pressing, so that in great measure conventional equipment may be utilized to achieve the desired product. Moreover, the process achieves very high yields of useable tool steel material in relation to the raw materials utilized.

One of the important advantages realized in the process of the invention is the ability to hot-roll or hot work the compacted billets into rods and bars of conventional form, achieving in the process a material of substantially 100 percent density. This important advantage is realized in the process of the invention by, among other things, the utilization of highly irregular, liquid-atomized particles of the tool steel. Indeed, the use of such irregular particles is deemed critical to the process. Heretofore, when dealing with starting material of tool steel analysis, it has generally been considered necessary to utilize gas-atomized particles, which necessarily are of a more spherical or rounded configuration. The consolidation of such particles into an adequately cohesive mass by conventional mechanical means has proven to be elusive. Cohesion of the rounded particles can be achieved through sintering operations or hot isostatic, but these are costly operations, both from a capital investment standpoint and with respect to operating costs.

In the procedure of the invention, highly irregular, liquid-atomized particles of tool steel analysis are encased in an elongated tubular sheath, which is sealed and thus forms an unconsolidated billet. This billet subsequently is subjected to heating and radial compaction to consolidate the encased metal particles to an apparent density of 80 percent or more. The irregular particles become locked together during consolidation and, after consolidation, the particles are sufficiently cohesive to permit the consolidated billet to be processed substantially in the manner of a conventionally cast billet. The new procedure enables important savings to be realized in the production of tool steel elements from atomized metal of tool steel analysis, in large measure because of the ability to process the billet with great facility and with conventional equipment.

For a more complete understanding of the invention, reference should be made to the following detailed description and to the accompanying drawing.

DESCRIPTION OF A PREFERRED EMBODIMENT

Figure 1:
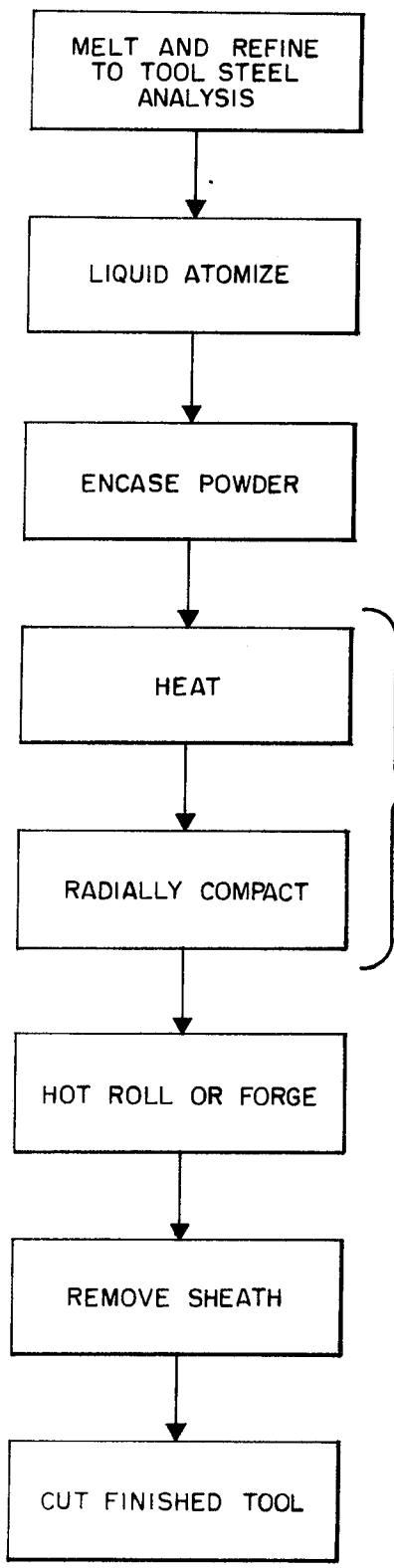
FIG. 1 is a highly simplified, schematic representation of the principal steps to be followed in the practice of the process of the invention.

As a starting point, the process of the invention involves the preparing of a supply of molten metal of tool steel analysis. Typically, this molten metal supply may be derived by simply melting down the raw materials that will yield the desired tool steel analysis.

For the purpose of this invention, steel of tool steel analysis may be considered to be steel having 1 percent or more by weight of tungsten, vanadium, molybdenum, cobalt or chromium and containing 0.3 percent or more of carbon. Tool steel grades are generally well recognized and defined in the trade.

In accordance with the invention, the molten metal of tool steel analysis is subjected to atomization by high pressure jets of quenching liquid, with the atomizing and quenching operation being carried out in such manner as to achieve a highly irregular particle shape. Of importance to the process, the atomizing procedure must also be carried out in such manner as to limit the oxygen impurity content of the atomized metal particles, after drying, to less than 0.25 percent. This is of particular significance in the processing of materials of tool steel analysis, because the important alloying constituents of the tool steel have a strong tendency to form oxides which, as a matter of practical commercial processing, cannot be readily eliminated without creating other problems.

To great advantage, the atomization of the molten tool steel may be carried out in accordance with the processes of my earlier U.S. Pat. No. 3,646,176. In accordance with the disclosures of that patent, a narrow stream of the molten tool steel is directed downwardly into an enclosed atomizing chamber from which air is excluded. As the molten metal stream enters the chamber, it is impinged upon in a plurality of closely spaced stages by opposed pairs of high pressure jets of cooling liquid, directed downwardly at an angle and being ejected under a pressure of around 500 psi or greater. Throughout, the metal is maintained in highly turbulent contact with the cooling liquid until its temperature is reduced below that at which the metal will readily oxidize. The process described in and covered by my above-mentioned patent can achieve particles of a highly irregular shape, substantially within the size range of 28 to 325 mesh, which is highly desirable for the purposes of the present invention. The present invention is not, of course, to be considered as limited to the use of atomized particles produced in accordance with my above-mentioned U.S. Pat. No. 3,646,176, but the process does require the use of highly irregularly shaped atomized particles of very low oxide content, such as are characteristic of the techniques of that patent.

The atomizing process, for deriving atomized tool steel for the process of the invention, is typically carried out in a manner to achieve the following approximate sieve analysis of particle sizes:

28–100 mesh — 45 percent
100–200 mesh — 35 percent
200–325 mesh — 14 percent
smaller than 325 mesh — 6 percent The sieve analysis recited above is based upon the U.S. Sieve Series, A.S.T.M. specification E—11—61. The recited sieve analysis provides a desirable intermix of particle sizes for the purposes of this invention.

Atomized particles of tool steel analysis, meeting the requirements mentioned above with respect to low oxygen impurity content, may be, and in accordance with the invention desirably are, utilized directly in the as-atomized metallurgical state. That is, the particles do not require reducing, annealing or other metallurgical treatment in particle form.

Figure 2:
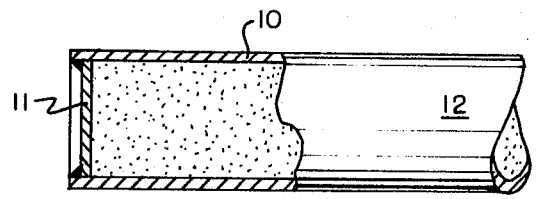
FIG. 2 is a fragmentary view, with parts broken away, illustrating a technique according to the invention for the encasement of atomized tool steel particles as a preliminary step in the process.
Figure 4:
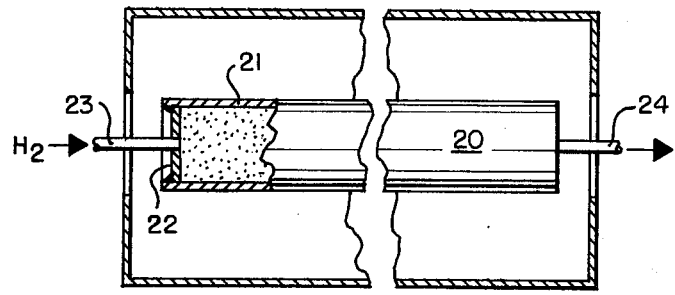
FIG. 4 is a simplified representation of a modified arrangement for the encasement of atomized tool steel particles, accommodating the introduction of process gases into contact with the atomized particles during the processing thereof.

In the process of the invention, the as-atomized particles derived from the atomizing process are encased in an elongated metal tubular sheath, as reflected by the reference numeral 10 in FIG. 2. The metal sheath 10, which is a thinwalled tubing formed of a mild steel (e.g., No. A.S.E. 1015), may advantageously be on the order of 1½ to about 6 inches in diameter, to begin with, and up to, say, 9 or 10 feet in length. The tubular encasement 10 is provided with caps 11 at each end, suitably secured as by welding. Typically, the atomized metal particles may be poured in through one open end of a tubular encasement, which may be agitated or otherwise manipulated to assure removal of any air pockets and provide maximum initial apparent density of the powder. The completely filled tube is then closed off and sealed by the second end cap 11, which may be welded in place.

After encasement of the atomized powder, the unconsolidated "canned billet" 12 is placed in a furnace and heated uniformly to a temperature in the range of 1,700°–2,250° F. In accordance with one aspect of the invention, the unconsolidated billet may be removed from the furnace any time after the atomized powder within reaches the desired temperature level. In this respect, sintering of the particles at this stage, while tolerable in the process, is not an objective thereof.

After the encased metal particles are brought up to heat, the unconsolidated billet is subjected to radial compacting to increase the apparent density of the encased powder particles. To this end, a rotary swaging press has been found to be ideally suited to the task of achieving radial compaction. In practice, a Model 6F continuous rotary swaging press, as commercially made available by the Fenn Manufacturing Company, Newington, Conn., proved to be entirely suitable for carrying out the radial compaction stage of the process.

Theoretically, at least, radial compacting of the unconsolidated billet may be achieved by rolling operations. However, conventional rolling techniques have a tendency to elongate the unconsolidated billet to an extent greater than desired. Thus, while the procedure of the invention does not necessarily exclude radial compaction by rolling techniques, if properly carried out, rotary swaging is a preferred technique because of its reduced tendency to effect elongation of the billet during radial compaction, resulting in greater effective consolidation of the powder.

Figure 3:
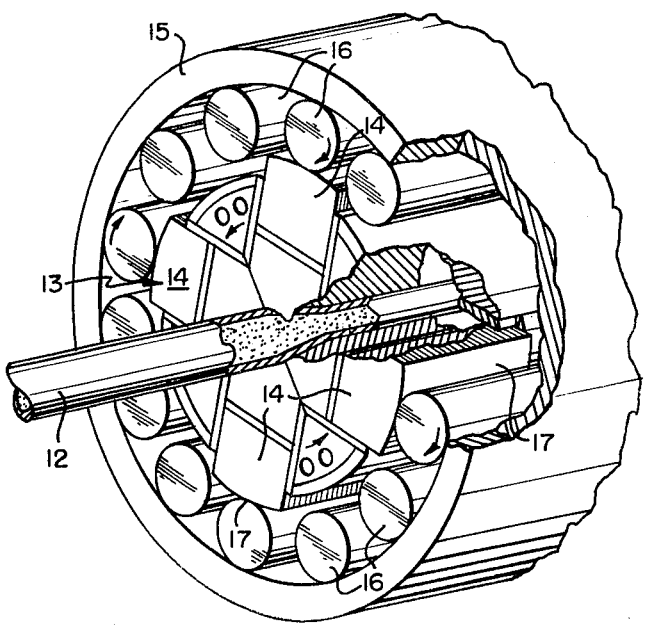
FIG. 3 is a fragmentary perspective view of a rotary swaging device utilized to advantage in the process of the invention.

As reflected in FIG. 3, a conventional rotary swaging apparatus includes a rotary jaw assembly 13 including, in the illustrated arrangement, four evenly spaced jaws 14 arranged for radial movement. Surrounding the jaws is a cylindrical confinement ring 15 containing a plurality of roller elements 16 arranged to bear against the arcuate outer surfaces 17 of the swaging jaws. As the rotary jaw assembly 13 is rotated, centrifugal force tends to throw the jaws 14 radially outward. However, as the rotation proceeds, the arcuate end surfaces 17 of the jaws repeatedly engage the surfaces of the rollers 16. The dimensional relationships of the parts are such that the rollers 16 drive the jaws radially inward. As reflected in FIG. 3, the inner surfaces of the jaws 14 are shaped and contoured to effect a desired degree of radial compaction of a billet 12 as it is progressively fed through the jaw opening.

During the repetitive actuations of the jaws, the billet 12 is controllably manipulated so as to be advanced longitudinally between compaction strokes and also to provide controlled relative rotation between the billet and the press jaws. Desirably, the relative rotation continually repositions the work in the jaws, so that the parting lines between adjacent jaws align with different portions of the work on successive strokes.

Advantageously, the tubular encasement is reduced in area by about 25 to 45 (and preferably by about 40) percent in the first stage of radial compaction. The actual extent of the area reduction achieved in this first stage is, of course, somewhat a function of the apparent density of the starting material. Desirably, this initial apparent density is on the order of 45 percent, in which case the initial area reduction in the tubular encasement may be, for example, on the order of 40 percent.

Following the first stage of radial compaction, the partially consolidated billet is again introduced into the furnace and heated uniformly to a temperature substantially in the range of 1,800° to 2,300° F. In the second stage, the billet may to advantage be heated to a higher temperature than in the first stage, because the material now has a greater density and there is somewhat less concern with the avoidance of an excessive degree of sintering action on the metal particles. In the first stage of heating, an excessive amount of sintering could be deleterious as it might result in voids within the billet. After the first stage of radial compacting, however, the billet has been substantially increased in the apparent density of the metal particles, and the matter of voids resulting from sintering of the metal during the second stage of heating is a problem of lower magnitude. Nevertheless, even at this stage, it is an objective of the process to avoid an excessive degree of sintering action.

After the second stage of heating, the billet is again removed from the furnace and subjected to a second stage of radial compaction, again ideally in a rotary swaging machine. As will be understood, the second stage of rotary compaction can be carried out in a second rotary swaging machine or in the original machine after changing of the jaws to accommodate the new dimensions of the billet and effect the desired further reduction of cross sectional area. The second reduction should typically be in the range of 20 to 40 percent in area, and preferably about 30 percent.

In accordance with the parameters of the new process, the billet 12 after the final stage of radial compaction, should have an apparent density of the metal particles of at least 80 percent. More ideally, the apparent density of the metal particles should lie within the range of 85 percent or more. If the final apparent density of the metal particles is less than 80 percent, difficulty is likely to be experienced in the subsequent processing of the billet toward a finished product, because there is inadequate cohesiveness among the particles. During subsequent hot working stages, for example, the poorly coherent particles may tend to exhibit behavior of a liquid material and rupture the walls of the encasing sheath 10 as further working of the metal is attempted. On the other hand, while continued radial compaction of the billet beyond a level of 95 percent apparent density of the metal particles would not be deleterious from a metallurgical standpoint, it could in some cases add unnecessarily to the overall cost of the process. In this respect, a billet 12 produced in accordance with the process and radially compacted to an apparent density of 95 percent is capable of being further processed by conventional hot rolling or hot working techniques familiar to and practiced by processors of tool steels. In some instances, cost advantages may be derived from commencing the employment of conventional processing techniques at the earliest practicable stage.

It is contemplated by the invention that radial consolidation or compaction of the billet to the desired 85 percent or greater apparent density level will require at least two stages of heating and compacting, substantially as described above. However, it is also contemplated that more than two such stages of heating and compacting may be either required or preferred in some instances in order to achieve a billet having the desired final characteristics.

By way of example, in a typical practice of the process of the invention an unconsolidated billet filled with particles having the analysis of M—2 tool steel (AISI) was reduced from 1½ inch initial diameter to 11/16 inch final diameter in two stages of heating and rotary swaging. The same material was processed from a 3¼ inch diameter unconsolidated billet to a consolidated diameter of 2⅛ inches in two stages. Billets of M—1 steel were processed from 1¾ inch to 11/16 inch diameter and from 3½ inch to 2⅛ inch diameter in three stages.

After the billet has been processed to the typically desired 85—95 percent apparent density, it may, if desired, be sintered prior to further processing. Experience indicates that such sintering is not necessary. However, it is not deleterious to the ultimate product, as could be the case if excessive amounts of sintering occurred prior to the initial stage of radial compaction, for example.

The compacted billet, with or without a final sintering step, is suitable for shipping, handling and processing substantially as a conventionally produced billet. During the further processing, which conventionally is carried out by hot rolling, hot working, or other suitable process for working and reducing the size of the billet, the radially compacted metal typically is further consolidated to 100 percent density. It is not vital to the process, however, that 100 percent density be achieved, as actual experience has demonstrated that superior cutting tools are achieved with the materials produced according to the invention, even though the material has a density of less than 100 percent.

When the billet has been reduced to the desired form of rod or bar stock, the tubular encasement 10 is removed, typically by a grinding operation. In this respect, in the processing of conventional tool steel materials, it would be customary at this stage to grind the surface of the stock to remove scale and provide a clean surface. The conventional operation presents some difficulties, of course, since the material being removed is tool steel. In addition, this operation alone results in a loss of yield of 7—10 percent on a 5/16 inch diameter rod, for example. The process of the invention has advantages in this respect, in that the grinding operation principally removes the soft steel of the encasing tube, and relatively smaller amounts of the harder and the more expensive tool steel are required to be removed. For this and other reasons, significantly higher yields of the tool steel are achievable with the process of the invention than with conventional processes.

Although the present invention does not contemplate any separate oxide reducing stage or procedure, subsequent to the atomization of the molten tool steel, it is very advantageous in most instances to introduce a reducing agency, such as hydrogen gas or carbon into the tubular encasement of the billet during or in advance of the first heating stage. For effecting gas reduction, the billet sheath 21 is constructed with welded-on end caps 22 provided with suitable small diameter entry and exit pipes, 23, 24. During the heating process, hydrogen or other reducing gas may be introduced into the interior of the sheath 21, achieving two ends: first, the air content within the sheath will be driven out, to avoid unnecessary exposure of the metal particles to oxygen during the heating stage; secondly, hydrogen can be supplied in sufficient quantity to react with oxides, to the extent there are reactable oxides present. Analyses made with materials processed according to the invention have indicated, for example, an oxide level of 1,500 ppm in the pre-consolidated powder and 800 ppm in the finished billet, reflecting a reduction of 700 ppm by hydrogen reaction in the first heating stage. In this respect, however, it is pointed out that a substantial reducing operation is generally not feasible in the processing of materials of tool steel analysis, because the complex oxides of the alloying constituents are not readily broken down. For this reason, the ability to introduce hydrogen or other reducing gas during the heating stages does not eliminate the need for deriving the materials from the atomizing stage with extremely low oxide content.

The process of the invention makes it possible to realize, on a wholly economic and commercially feasible basis, the important advantages of deriving tool steel elements from atomized metals of tool steel analysis. Because of the relatively rapid cooling of the atomized metal, and of the shattering of the molten metal into individual particles prior to solidification, a much superior distribution of carbides and alloying constituents is realized. With respect to carbide distribution, for example, a measure accepted by the trade is the so-called "intercept size" which should be as high as practicable. In tool steels derived by conventional ingot casting and processing, an intercept size of 13 is considered good, and 17 is about the maximum that can be obtained. With the process of the invention, by contrast, intercept sizes of over 20 are readily obtainable and values approaching 23 have been achieved.

By deriving the particulate tool steel material from a low oxide, liquid-atomizing process, the important advantages of atomized tool steel may be derived with economies suitable to large scale commercial production. The particles of metal are derived in an angular, irregular form, rendering them highly suitable for encapsulation and subsequent processing, in large measure by conventional hot rolling or forging techniques.

In the process of the invention, after preliminary encapsulation of the atomized metal powder in the form of elongated unconsolidated billet, the unconsolidated billet is heated and subjected to mechanical radial compaction, in the absence of an equivalent amount of elongation to effect an increase in apparent density. Rotary swaging equipment is ideally suited to this stage of the process. Importantly, this preliminary consolidation phase is carried out in a plurality of stages of heating and radially compacting and in the absence of such excessive amounts of sintering as would result in significant voids.

After the billet has been initially radially compacted according to the procedures of the invention, to an apparent density of 80 percent or greater, the billet is in a condition to be handled and processed in a more or less conventional manner to achieve cutting tools or other end products. Cutting tools, for example, made from materials produced in accordance with the new process exhibit a significantly improved operating life as compared to cutting tools derived from tool steels of conventional manufacture.

The process according to the invention can be used to particular advantage in the production of composite tool steel materials, for example. Thus, in certain tool elements such as taps, hobs, mills, and the like, it is advantageous to provide a surface of high hardness, in conjunction with a central core of a softer but tougher character. With conventional materials this can be achieved to a limited extent by heat treatment processes. However, utilizing the process of the invention, it is economically and otherwise practicable to provide for a core of a different alloy analysis than the surface area. As a result, independently of the heat treating process, the cutting edges formed at the surface may be of extremely high hardness, while the interior portion of the tool may have an analysis which is stronger and less brittle.

It should be understood, of course, that the specific forms of the invention herein illustrated and described are intended to be representative only and that certain changes may be made therein without departing from the clear teaching of the disclosure. Accordingly, reference should be made to the following appended claims in determining the full scope of the invention.

I claim:
1. The process of producing billets of tool steel, which comprises
   a. producing molten steel of tool steel analysis,
   b. atomizing the molten tool steel by liquid jets to produce small, highly irregular particles substantially free of oxygen impurities,
   c. encasing the atomized particles in an elongated tubular sheath, and
   d. heating the encased particles and compacting them principally in radial directions to form an encased tool steel billet suitable for hot working into tool stock.
2. The process of claim 1, further characterized by
   a. the heating and radial compacting of the encased tool steel is carried out in at least two stages.
3. The process of claim 2, further characterized by
   a. the metal particles being heated to a temperature in the range of 1,700° to 2,250° F. in a first stage of heating and then radially compacted to a density greater than 55 percent, and
   b. the particles thereafter being further heated in a subsequent stage to a temperature in the range of 1,800° to 2,300° F. and further compacted to a density greater than 80 percent.
4. The process of claim 2, further characterized by
   a. the metal particles being radially compacted by rotary swaging in at least two stages, and
   b. the cross-sectional area of the billet being reduced approximately 25 to 45 percent in a first stage and an additional approximately 20 to 40 percent in a second stage.
5. The process of claim 4, further characterized by
   a. the atomized metal particles being of a size predominantly smaller than 20 mesh and predominantly larger than 325 mesh, b. the initial apparent density of the encased metal particles being on the order of 50 percent or less, and c. the apparent density of the particles after rotary swaging being greater than 80 percent.

6. The process of claim 5, further characterized by a. the apparent density of the encased particles after rotary swaging being substantially in the range of 85 percent or greater.

7. The process of claim 1, further characterized by a. the atomized metal particles, prior to radial compaction, having an oxygen content of 0.25 percent or less.

8. The process of claim 7, further characterized by a. the encased metal particles being exposed to a reducing gas during the heating thereof prior to radial compacting.

9. The process of claim 8, further characterized by a. the reducing gas being hydrogen.

10. The process of producing billets of tool steel which comprises a. supplying a body of molten steel refined to tool steel analysis, b. water atomizing the molten steel by subjecting the molten steel to the action of opposed pairs of high pressure jets of quenching water in a plurality of closely spaced stages and maintaining the atomized particles in contact with highly turbulent water until cooled below the temperature at which oxidation of the steel readily occurs, c. encasing the particles, while in an unannealed form, in an elongated tubular sheath of light gage soft steel, d. heating the encased particles for a period not significantly longer than necessary to bring the particles uniformly to a temperature of between about 1,700° and about 2,250° F., e. compacting the encased heated particles principally in radial directions to increase the density thereof to substantially above 50 percent, f. heating the encased and radially compacted particles in a second stage for a period not significantly longer than necessary to bring the particles uniformly to a temperature of between about 1,800° and about 2,300° F., and g. radially compacting the reheated particles in a second stage to a density substantially in the range of 80 percent or more.

11. The process of claim 10, further characterized by a. the stages of radial compacting being carried out by rotary swaging.

12. The process of making a cutting tool with a tool steel billet of claim 11, which comprises a. hot working said billet in one or more stages to further compact said tool steel to 100 percent density and to reduce the thickness of the billet, b. removing the steel tubing encasement surrounding the tool steel, and c. thereafter machining the cutting tool from the hot worked steel.

13. The process of producing billets of tool steel which comprises a. supplying water atomized steel of tool steel analysis having an oxide content not significantly in excess of 0.25% and having a particle size range substantially smaller than 20 mesh, b. encasing the metal particles in an elongated tubular sheath of soft steel, c. heating the encased particles and compacting them principally in radial directions in at least two stages to an apparent density of at least 80 percent, and d. during the heating and compacting steps, maintaining the metal particles in contact with a reducing agency.

* * * * *